G. G. BABICH.
SHIP PROTECTING DEVICE.
APPLICATION FILED MAY 3, 1917.
1,241,902.
Patented Oct. 2, 1917.
5 SHEETS—SHEET 2.
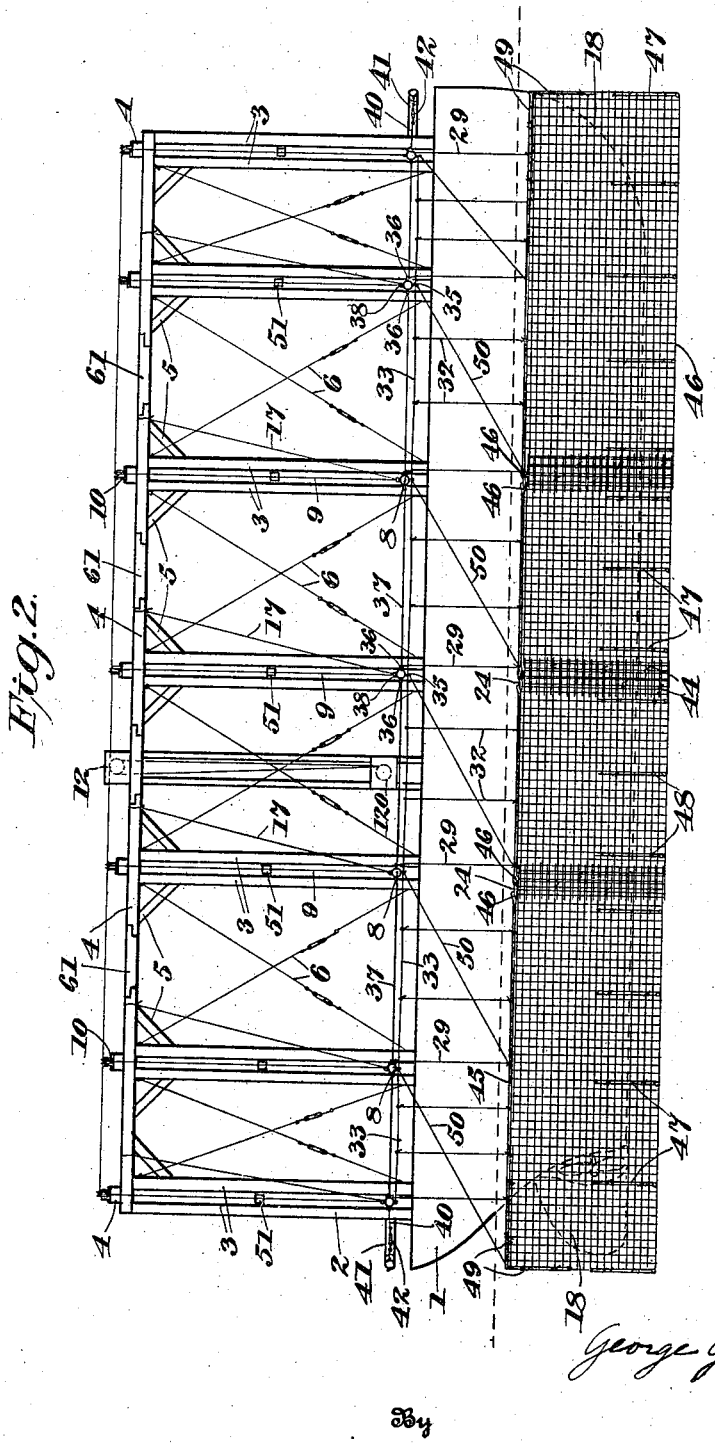
Inventor
George G. Babich
By
Frederick V. Winter Attorney G. G. BABICH.
SHIP PROTECTING DEVICE.
APPLICATION FILED MAY 3, 1917.
1,241,902.
Patented Oct. 2, 1917.
5 SHEETS—SHEET 3.
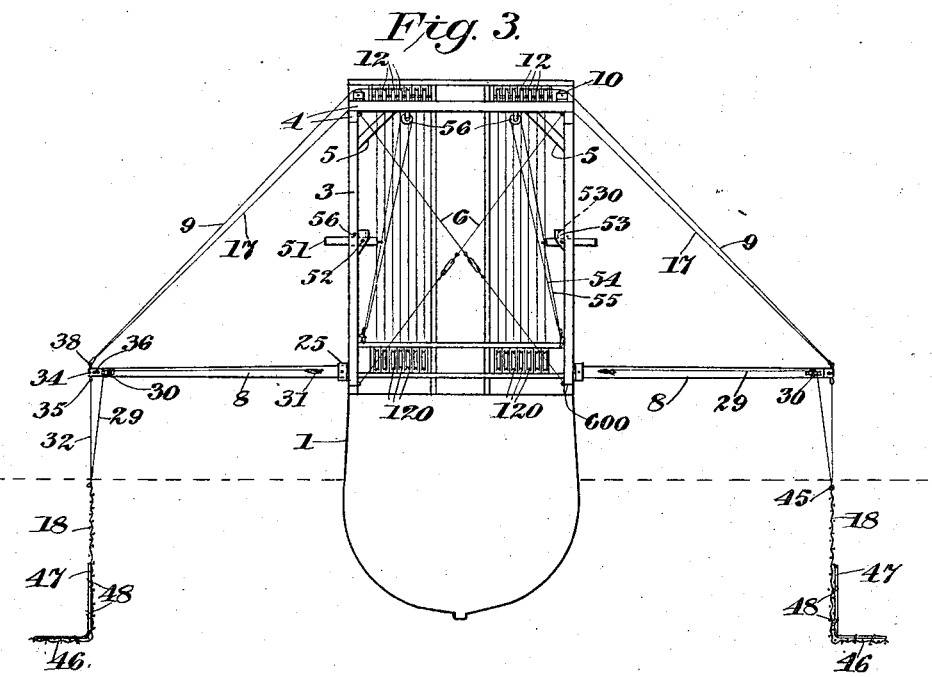
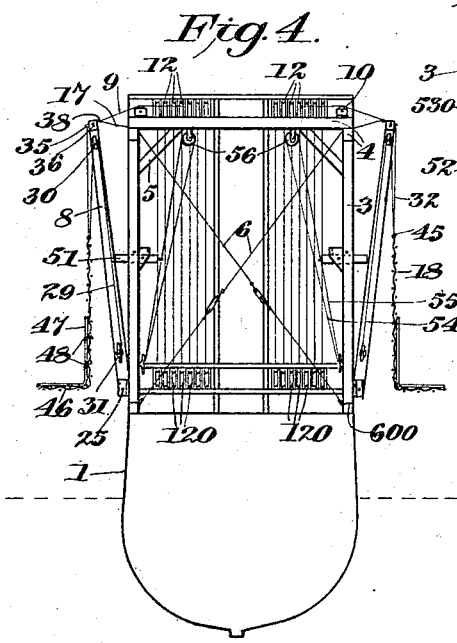
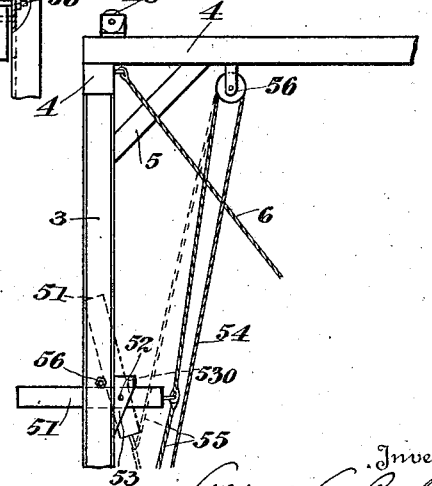
Inventor
George G. Babich
By
Frederick V. Winter, Attorney

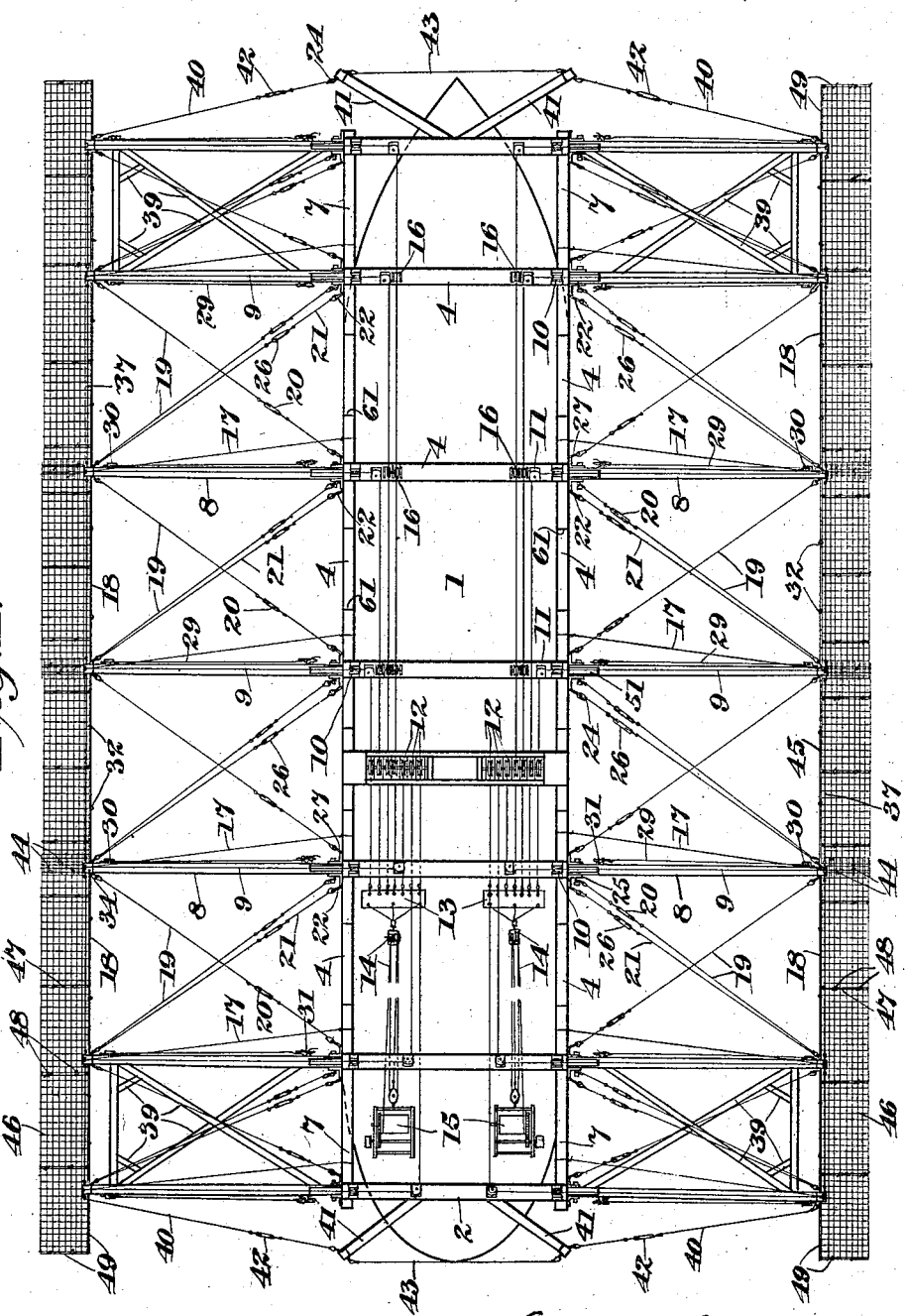

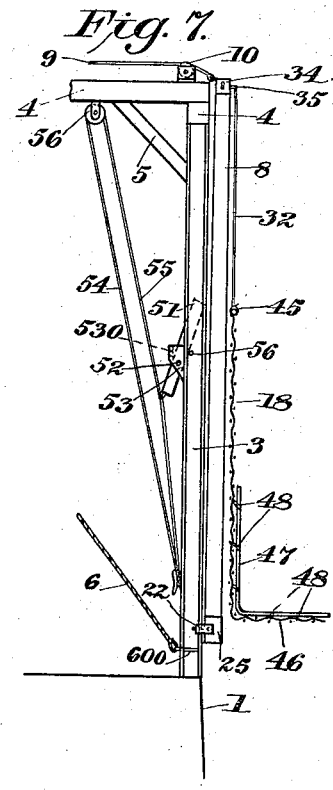
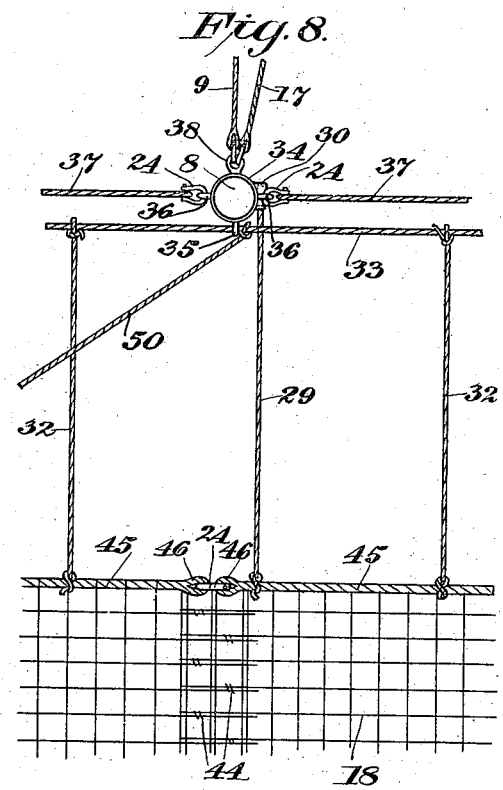
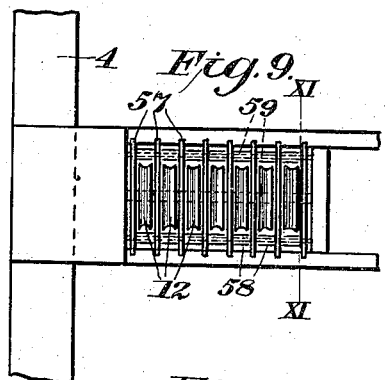
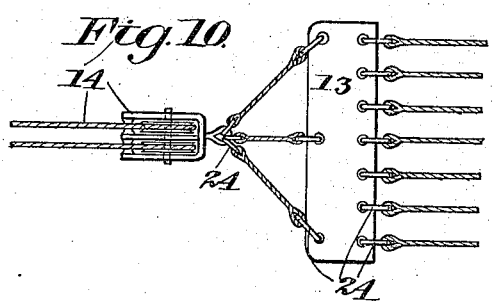
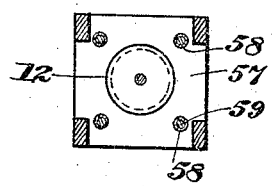

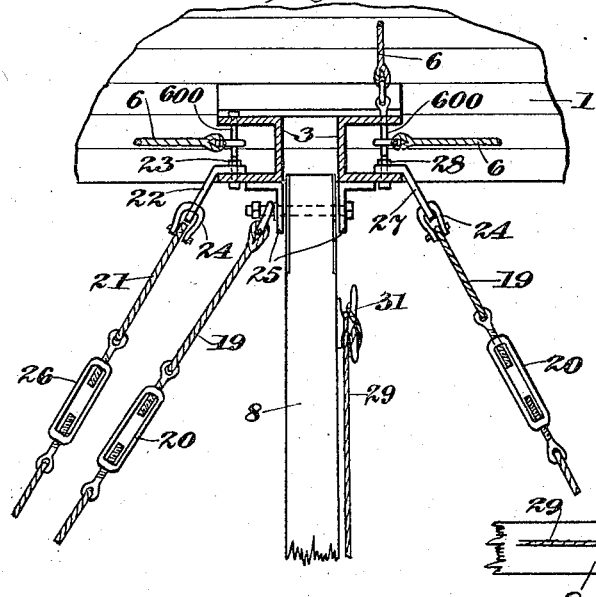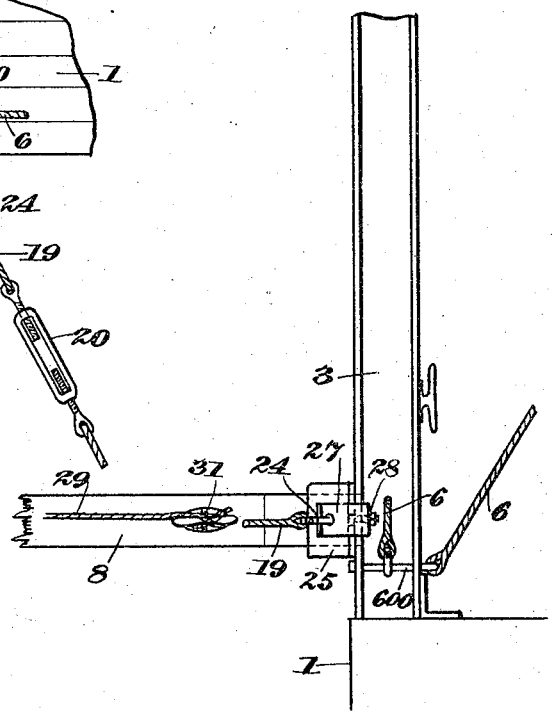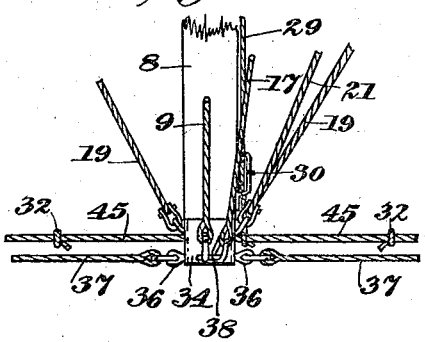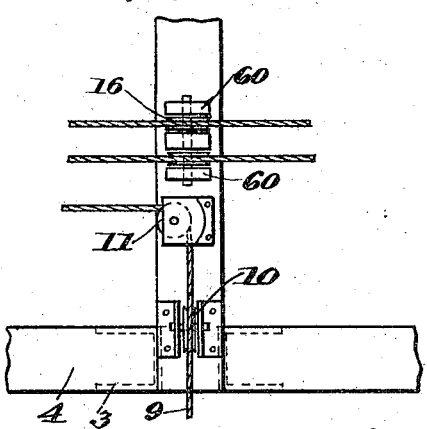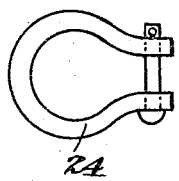

UNITED STATES PATENT OFFICE.

GEORGE G. BABICH, OF NEW YORK, N. Y.

SHIP-PROTECTING DEVICE.

1,241,902.　　　　　Specification of Letters Patent.　　Patented Oct. 2, 1917.

Application filed May 3, 1917.　Serial No. 166,158.

*To all whom it may concern:*

Be it known that I, GEORGE G. BABICH, a citizen of the United States, residing at New York, in the county and State of New York, have invented certain new and useful Improvements in Ship-Protecting Devices, of which the following is a full, clear, and exact specification.

This invention relates to means for protecting ships against torpedoes, and has for one of its objects to provide improved and simplified means for moving said means into and out of operative position.

Another object is to provide improved means for holding the torpedo intercepting means at different distances from the free ends of the booms on which they are supported, in order to permit adjustment of said torpedo intercepting means according to the draft of the ship when loaded or empty. A further object is to provide improved means for bracing the booms and the torpedo intercepting means when the latter is in the water and the ship is in motion.

It is also the aim of this invention to provide sectional torpedo nets with means for detachably connecting them end to end, so that one or more of said sections may be removed if in the way when loading or unloading the vessel. Another object is to provide torpedo nets with outwardly turned flanges at their lower edges so that if a torpedo strikes the nets a downwardly glancing blow it cannot pass below the same and reach the ship.

The invention further contemplates the provision of adjustable means for holding the booms in an outwardly inclined position to facilitate the lowering of the same when at sea, or for permitting said booms to be brought to upright position when in port. Other objects will appear as the description proceeds.

In the accompanying drawings, wherein similar reference characters are used to designate corresponding parts throughout the several views:—

Figure 1 is a plan view of a ship equipped with torpedo intercepting means according to this invention, said torpedo intercepting means being shown in lowered position as when in use at sea.

Fig. 2 is a side view of the ship with the nets lowered.

Fig. 3 is an end view of the ship with the nets lowered.

Fig. 4 is a similar view with the nets raised to the position which they occupy at sea when not in use.

Fig. 5 is a detailed view of one of the pivoted arms for holding the booms in inclined position when raised, as shown in Fig. 4, and the means for actuating said arm from the deck.

Fig. 6 is a detailed view of the means for securing said arm in either of its positions.

Fig. 7 is a detailed view showing one of the booms raised to vertical position, as when the ship is in port.

Fig. 8 is a broken detail on a larger scale of a portion of one of the torpedo nets and its supporting means, showing particularly how said net is made up of separable sections.

Fig. 9 is a detail of one set of sheaves for guiding the cables for raising the booms.

Fig. 10 is a detail of one of the yokes to which the cables attached to the booms on one side of the ship are fastened in order that said booms may be raised or lowered simultaneously.

Fig. 11 is a section on the line XI—XI of Fig. 9, showing more particularly the spacing sleeves between the plates separating the sheaves.

Fig. 12 is a detailed plan view of the connections between each of the booms and its braces, and the superstructure on the ship.

Fig. 13 is a broken side view of the same parts.

Fig. 14 is a detailed view of the free end of one of the booms, showing how the various cables for raising and lowering, supporting the nets, etc., are secured thereto.

Fig. 15 is a detailed plan view of the sheaves for guiding one of the hoisting cables for the booms over the edge of the superstructure and along the same, the sheaves for guiding two of the other hoisting cables along the superstructure also being shown, and Fig. 16 is a detailed view of one of the metal fastening devices or shackles used for connecting the sections of the nets together and also for attaching the various cables to parts of the device.

On the deck of the ship 1 there is erected a superstructure 2 preferably extending substantially the full length of the ship and consisting of uprights 3 and cross members 4 connecting the tops of said uprights. This superstructure is suitably braced, as indicated in the drawings, by rigid braces 5 and diagonally arranged cables 6 each having a turn-buckle for the purpose of adjustment.

It will be understood that the uprights of each side of the superstructure are in line with one another, as shown, said superstructure being built out over the sides of the ship at the bow and stern where the sides converge, as indicated at 7 in Fig. 1. As illustrated in the drawings, the booms 8, for supporting the torpedo nets, are hinged to the uprights 3 of the superstructure near their lower ends, so that said pivots are arranged slightly above the deck. While this is the preferred arrangement, it is obvious that said booms may be hinged at higher or lower points if desired to suit different requirements. Inasmuch as the uprights along each side of the ship are in line, the hinges of the booms on each side are also in alinement and are so arranged that each boom is adapted to swing in a vertical plane at right angles to the vertical longitudinal axis of the ship. This arrangement is important because all of the booms on the same side of the ship are designed to be raised or lowered simultaneously in order to save time and insure the nets being lowered into operative position in time to meet any emergency. The booms on either side of the ship may also be raised or lowered independently of those on the other side, so that if only one side of the ship is exposed to danger from torpedoes, then only the net on that side need be used.

A hoisting cable 9 is attached to the free end of each boom and passed over a sheave 10 at the top of the upright of the superstructure to which said boom is hinged. The sheave 10, Fig. 15, rotates on a horizontal axis. The hoisting cable then passes around a sheave 11 having a vertical axis, and thence along the top of the superstructure to one of a series of sheaves 12 having horizontal axes arranged transversely of the ship. After passing around one of the sheaves 12, the hoisting cable passes under one of a series of similar sheaves 120 on the deck of the ship, and is finally connected to a yoke 13 which is in turn connected by block and tackle 14, Fig. 10, to a winch 15, Fig. 1, located at any suitable place on the deck. The hoisting cables for the booms which are not arranged adjacent to the sheaves 12 are guided between their sheaves 11 and the sheaves 12 by other sheaves 16 mounted on the cross pieces 4 of the superstructure, as shown in Figs. 1 and 15. The hoisting cables of all the booms on the same side of the ship are connected to the same yoke 13 and controlled by the same winch, so that all of said booms on one side may be raised or lowered simultaneously, there being a separate yoke, winch and set of hoisting cables for the booms on the other side of the ship, as will be readily understood from the drawings.

The booms may be made of any desired length and the height of the superstructure may be varied, although it is preferable to have the superstructure substantially the same height as the booms when the latter are raised, as shown in Fig. 7, in order to facilitate the operation of the hoisting cables. To support the booms in lowered position, cables 17 are adjustably connected to the free ends of the booms and the superstructure, said cables 17 being inclined with respect to the booms, as shown in Fig. 1, in order that they may not interfere with the booms being raised up closely against the uprights of the superstructure, as shown in Fig. 7. The supporting cables 17 are adjustably fastened to the superstructure, or to the free ends of the booms, or at both places, so that the position of the free outer end of each boom, when lowered, may be regulated as desired to support the torpedo nets 18 at a greater or less depth according to whether the vessel is loaded or empty. As a general proposition, the nets 18 should extend to substantially the same depth as the keel of the ship, but it may be desirable to have said nets extend somewhat lower, as indicated in Fig. 3.

The booms are braced against lateral strain when lowered and the ship is running with the nets submerged, by two diagonally arranged guy cables 19, one of which extends from the free end of each boom to the hinged end of the next boom toward the bow of the ship. These cables 19 are provided with turnbuckles 20 for adjustment. A single guy cable 21 extends from the free end of each boom to the base of the upright of the superstructure to which the next boom toward the stern is hinged. This connection consists of a bent link 22 attached to a bolt 23, Fig. 12, and a shackle 24, such as illustrated in Fig. 16, which pivotally connects said cable 21 in line with the hinges 25 of the booms. These cables 21 are also provided with turnbuckles 26. One of the two guy cables 19 from the free end of each boom is connected by one of the shackles 24 to an extension at one end of the hinge-pintle of the next boom in front, while the other cable 19 is connected by a shackle 24 and link 27 to a bolt 28 on the opposite face of the upright 3 from the bolt 23, Fig. 12. This arrangement brings the pivots of the connections of all the guy cables in alinement with hinges of the booms, so that said guy cables will remain taut when the booms are raised. It may here be noted that the cables 6 for bracing the superstructure are preferably connected to the bolts 600, as illustrated in Figs. 12 and 13.

The torpedo nets are adjustably supported from the free ends of the booms 8 by cables 29, each attached at one end to the upper edge of the net, as best shown in Fig. 8, and passed over a sheave 30 mounted on one side of the free end portion of the boom, the other end portion of the cable 29 being adjustably fastened, as at 31, to the same side of the hinged end portion of the boom. The nets are further supported by adjustable cables 32 extending between the upper edges of the nets, and cables 33 extending between the free ends of the booms. When these supporting cables 32 are unfastened, the nets may be raised or lowered with respect to the free ends of the booms by means of the cables 29 in an obvious manner. After such an adjustment is made, the supporting cables 32 are again secured taut.

The cable 33 may be connected to each boom by means of a collar 34 fitted over the free end thereof and having an eye 35 at the bottom through which said cable is passed Said collar is also provided with eyes 36 at its opposite sides to which guy cables 37 are connected by shackles 24, Fig. 8, and on top of the collar 34 there is another eye 38 to which the cables 9 and 17 are attached. The guy cables 37 help to brace the booms to one another and connect all the booms on one side of the ship together into a substantially single structure to be raised or lowered simultaneously. The booms are further braced by rigid braces 39, Fig. 1, between the pairs of booms at the bow and stern of the ship, and by guy cables 40 extending from the free ends of the booms at the extreme bow and stern to beams 41 extending obliquely from the bow and stern of the ship to points in advance of the front boom and to the rear of the rear boom. These cables 40 have turnbuckles 42 for the purpose of adjustment, and are attached to the beams 41 by shackles 24, such as illustrated in Fig. 16. The pivot of the shackle on the beam 41 is arranged in alinement with the hinges of the booms. The beams 41 are preferably braced by cables 43, one of which extends between the two beams at each end of the ship.

The torpedo nets are each composed of a plurality of sections which are detachably connected together by shackles 24 as indicated in Fig. 8, and also, if necessary, by tie wires 44. The nets may be made of woven wire material having a fine enough mesh to prevent the passage of a torpedo therethrough. The upper edges of the sections of the net are reinforced by cables 45 having loops 46 at their ends through which the shackles 24 are passed. The lower edge of each section of the net is bent outwardly to form a horizontal flange 46 designed to intercept a torpedo which strikes the net a downwardly glancing stroke, thus preventing said torpedo from passing under the net and reaching the ship. The flange 46 is preferably reinforced by angle rods 47 secured to the vertical portion of the net and to the flange by tie wires 48. It will be noted that the end sections of the net extend beyond the end booms, see Figs. 1 and 2, so as to protect the extreme bow and stern of the ship. Reinforcing rods 49 are secured to the upper and vertical edges of these projecting sections as best shown in Fig. 2. The nets are made in sections so that a portion of the net on either side of the ship may be removed to facilitate loading and unloading. A further advantage in making the nets in sections is that only the sections struck by an exploding torpedo need be replaced, instead of supplying a whole new net for one side of the ship. The mesh of the nets may be of such a size as to permit the cap or firing pin of a torpedo to pass through without exploding the projectile. When this occurs, the torpedo is held captive without doing any damage to the net.

When the vessel is moving ahead with the torpedo nets submerged, there is a tendency for said nets to swing rearwardly on their supporting cables 29 and 32, owing to the resistance offered by the nets to the water. To overcome this tendency downwardly and rearwardly inclined cables 50 extend between the free ends of the booms and the upper edges of the nets.

As illustrated in Fig. 7, the booms 8 may be swung up to lie close against the uprights 3 of the superstructure. When the ship is in port this is the preferred position of the booms; but when at sea it is preferable to have said booms stand at a slight incline when raised, so as to insure their swinging down by gravity without difficulty when released. To hold the booms in inclined position, as illustrated in Fig. 4, arms 51 are pivoted at 52 between blocks 53 attached to the uprights 3. These arms may be moved from a horizontal position to a position in line with the uprights 3 by means of ropes 54 and 55 attached to the inner ends of said arms. The rope 54 extends up over a pulley 56 suspended from the cross bar 4 of the superstructure and thence down into convenient reach from the deck. The cables 55 extend directly down from their connections with the arms 51, also into convenient reach from the deck. It is obvious that by pulling on the rope 55 and paying out the rope 54, the arm 51 may be swung from the horizontal position shown in solid lines in Fig. 5, to the dotted line position indicated in the same figure, where said arm is in line with the upright 3 of the superstructure and will permit the booms to be swung to upright position, as shown in Fig. 7. Each of the arms 51 may be secured in either of its positions by a removable bolt 56 passed through the upright in a position to engage the upper edge of the arm when the latter is in horizontal position, or the lower edge of said arm when the same is raised, see Figs. 5 and 6. A stop 530 extends between the blocks 53 for limiting the swinging of the arm 51 to the horizontal position by engaging the upper face of said arm as indicated in Fig. 5.

As illustrated in Figs. 9 and 11, the sheaves 12, which are grouped together in sets for the booms on each side of the ship, are preferably separated by plates 57 which are spaced apart by sleeves 58 strung on connecting rods 59. The sheaves 120 are separated and spaced apart in the same manner. The sheaves 16 are separated by plates 60.

The connecting bars 4 between the uprights 3 of the superstructure may have detachable sections 61 to permit said uprights to be spaced at different distances apart, according to the length of the ship. When the distance between said uprights is changed, the length of the sections 61 is, of course, changed to correspond.

Having thus described my invention, what I claim as new and desire to secure by Letters Patent of the United States is:—

1. The combination with a ship, of a plurality of booms each hinged at one end to the ship, torpedo intercepting means attached to the free ends of the booms, means for raising and lowering said booms, means for raising and lowering the torpedo intercepting means on the free ends of the booms, and means for positively supporting said torpedo intercepting means at different distances from the free ends of the booms for the purpose specified.

2. The combination with a ship, of a plurality of booms each hinged at one end to the ship, rigid braces between the pairs of adjacent booms at the bow and stern, connections between the free ends of all of the booms on each side of the ship, torpedo intercepting means attached to the free ends of the booms, and means for raising and lowering said booms.

3. The combination with a ship, of a plurality of booms each hinged at one end to the ship, a superstructure on the ship, sheaves on the superstructure, hoisting cables attached to the free ends of the booms and passed over said sheaves, a yoke to which the hoisting cables of all the booms on one side of the ship are connected, another yoke to which the hoisting cables of all the booms on the other side of the ship are connected, two winches, flexible connections between each yoke and corresponding winch, whereby all the booms on either side of the ship may be raised or lowered simultaneously and independently of those on the other side of the ship, and torpedo intercepting means attached to the free ends of the booms.

4. The combination with a ship, of a plurality of booms each hinged at one end to the ship, torpedo intercepting means attached to the free ends of the booms, a superstructure on the ship, hoisting means for the booms attached to their free ends and running over said superstructure, and means on the superstructure for holding the booms at an outwardly inclined position when raised.

5. The combination with a ship, of a plurality of booms each hinged at one end to the ship, torpedo intercepting means attached to the free ends of the booms, a superstructure on the ship having uprights against which the respective booms are adapted to lie when raised, and arms pivoted to said uprights and adapted to be turned at an angle thereto and extend into the path of the booms, whereby said booms may be held in an outwardly inclined position when raised.

6. The combination with a ship, of a plurality of booms each hinged at one end to the ship, torpedo intercepting means attached to the free ends of the booms, a superstructure on the ship having uprights against which the respective booms are adapted to lie when raised, arms pivoted to said uprights and adapted to be arranged in line therewith or at an angle thereto, said arms when in the latter position extending into the path of the booms, whereby said booms may be held in an outwardly inclined position, and removable bolts on the uprights for holding said arms in either position.

In testimony whereof I have signed my name to this specification.

GEORGE G. BABICH.

Copies of this patent may be obtained for five cents each, by addressing the "Commissioner of Patents, Washington, D. C."